Figure 1:
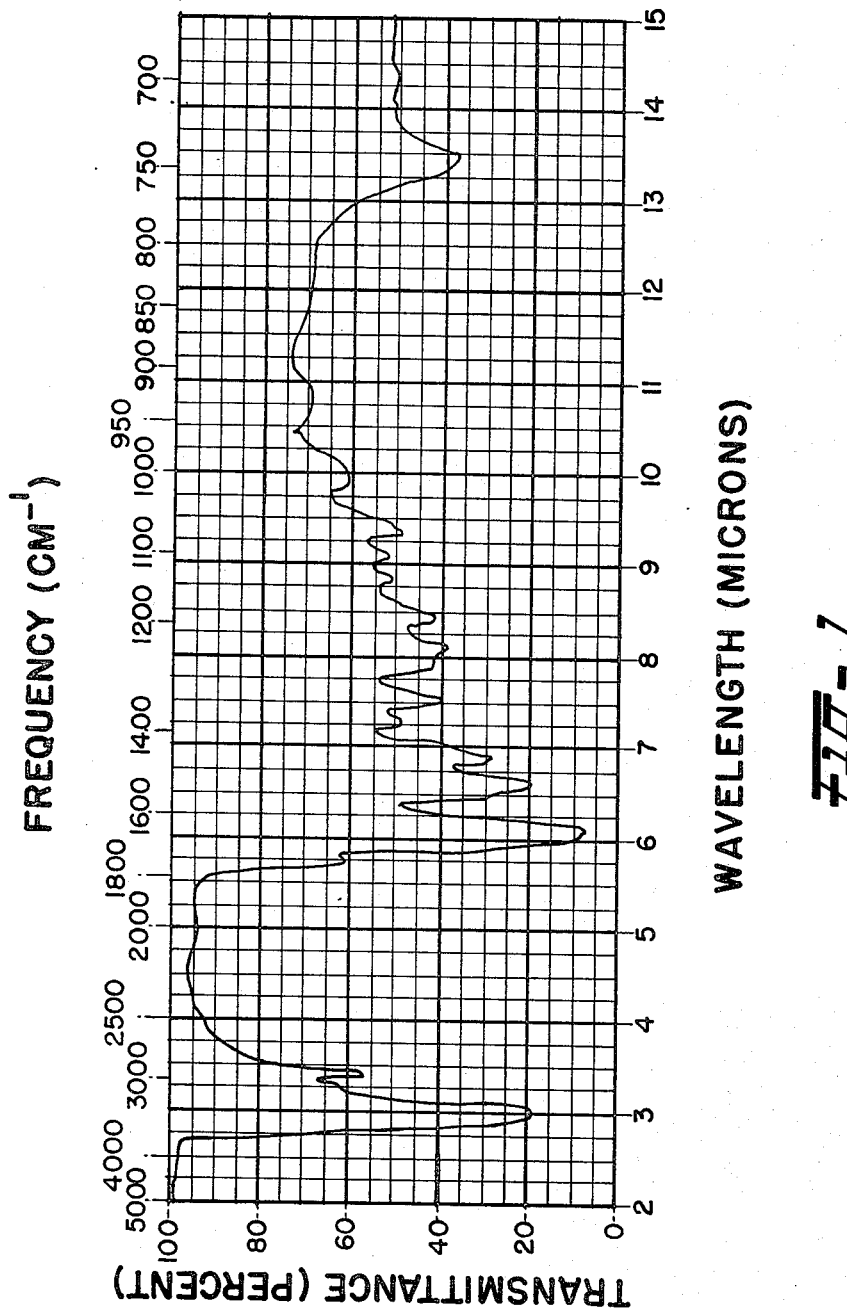

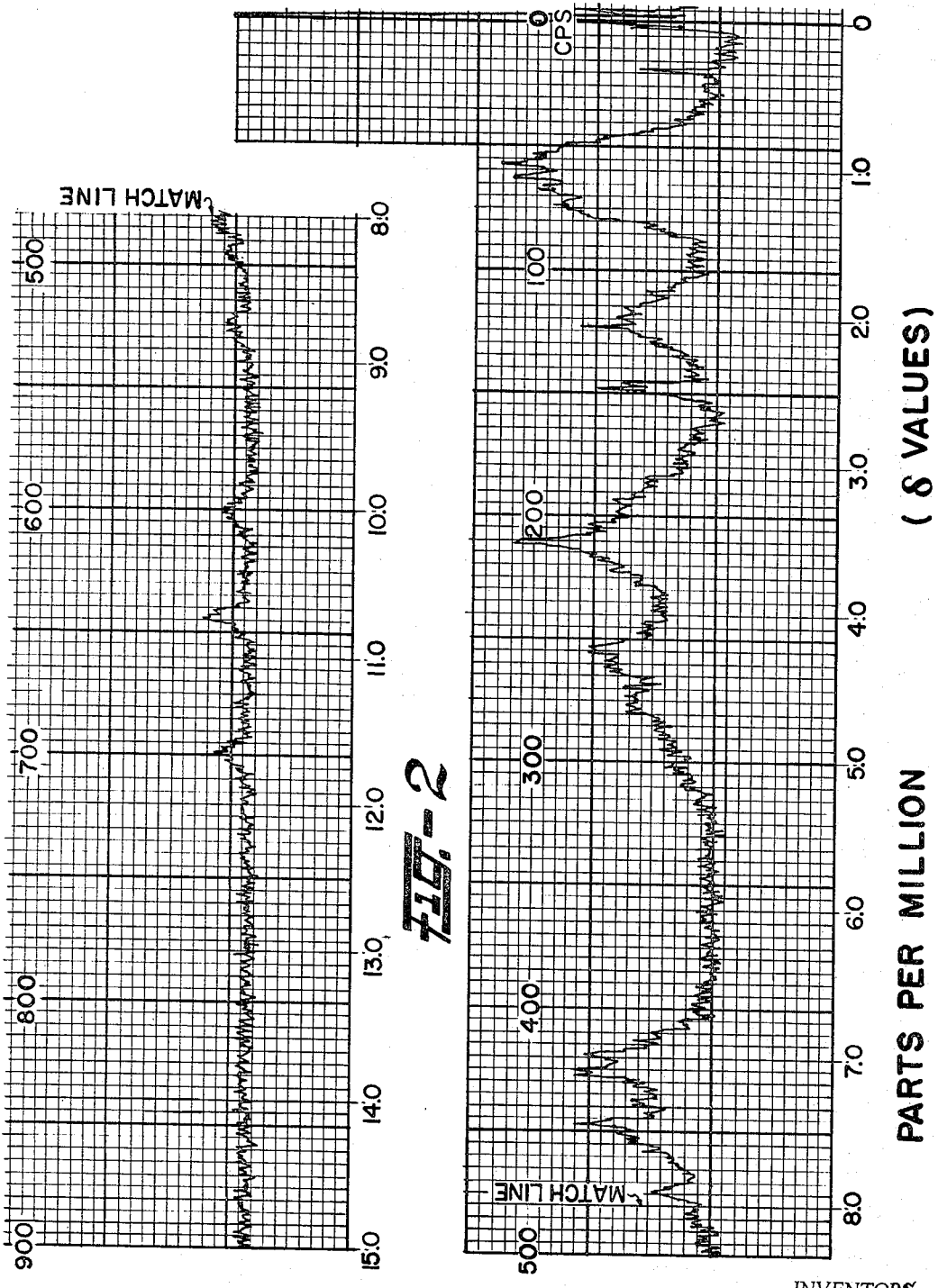

United States Patent Office 3,377,244
Patented Apr. 9, 1968

3,377,244
ANTIBIOTIC AO-341 AND PRODUCTION THEREOF
Howard Arnold Whaley, Monsey, and Ernest Leonard Patterson, Pearl River, N.Y., and Werner Karl Hausmann, Woodcliff Lake, and John Norman Porter, Ramsey, N.J., assignors to American Cyanamid Company, Stamford, Conn., a corporation of Maine
Filed Jan. 13, 1965, Ser. No. 425,151
6 Claims. (Cl. 167—65)

This invention relates to a new antibiotic, to its production by fermentation, to methods for its recovery and concentration from crude solutions, to processes for its purification and to methods for the preparation of its salts and other derivatives.

The invention includes within its scope the antibiotic in dilute forms, as crude concentrates, and in pure crystalline forms. These novel products are active against a wide variety of microorganisms including gram-positive bacteria. The effects of the new antibiotic on specific microorganisms, together with its chemical and physical properties, differentiate it from previously described antibiotics.

The new antibiotic of this invention which we have designated AO-341 is formed during the cultivation under controlled conditions of a new strain of *Streptomyces candidus*. The new strain of *Streptomyces candidus* was isolated from a soil sample taken in Alberta, Canada. Viable cultures of the new strain have been deposited with the Culture Collection Laboratory, Northern Utilization Research and Development Division, United States Department of Agriculture, Peoria, Ill. and they have been added to its permanent collection as NRRL 3147 and NRRL 3148, the latter being an ultraviolet induced mutant (UV-103) of the original soil isolate, the use of which is preferred from the standpoint of obtention of purer products.

The following is a description of the new strain of *S. candidus* based on the diagnostic characteristic observed. The underscored descriptive colors are taken from Jacobson et al., "Color Harmony Manual" 3rd ed. (1948).

*Amount of growth.*—Moderate on most media; light on Czapek's Solution Agar.

*Aerial mycelium and/or en masse spore color.*—Aerial mycelium and spores white. Sporulation light to moderate on most media.

*Soluble pigment.*—Absent on most media; light amounts of yellowish pigment on Carvajal's Oatmeal, Potato Dextrose and Tomato Paste Oatmeal Agars.

*Reverse color.*—In yellowish to light orange shades on most media.

*Miscellaneous physiological reactions.*—Nitrates reduced to nitrites; good gelatin liquefaction; no chromogenicity on peptone-iron agar. Carbon source utilization according to Pridham et al. [J. Bact. 56:107–114 (1948)] as follows: good to fair utilization of adonitol, l-arabinose, d-fructose, d-mannitol, d-melezitose, d-raffinose and dextrose; poor to non-utilization of dextran, i-inositol, d-trehalose, d-xylose, lactose, d-melibiose, l-rhamnose, salicin and sucrose.

*Morphology.*—Spores in long, straight to flexuous chains. Spores elongate to elliptical 0.4–0.6µ x 0.9–1.1µ and smooth-walled as determined by electron microscopy.

The systematic position of this culture falls within the white-spored streptomycetes having straight to flexuous spore chains. When compared according to these and other pertinent features with the members of this group, the isolate most closely fits the characteristics of the species *Streptomyces candidus*. In a side-by-side comparison of the new culture with reference specimens of this species, a close correspondence was found.

A critical examination of the cultural, physiological and morphological features of the organism was made when it was grown on several media, including those recommended by Pridham et al. ["A Selection of Media for Maintenance and Taxonomic Study of Streptomyces," Antibiotics Annual (1956–1957), pp. 947–953]. Detailed observations are recorded in Tables I, II, III and IV below.

TABLE I.—CULTURAL CHARACTERISTICS OF *STREPTOMYCES CANDIDUS* NRRL 3147
[Incubation: 14 days. Temperature: 28° C.]

| Medium | Amount of Growth | Aerial Mycelium and/or Spores | Soluble Pigment | Reverse Color | Remarks |
|---|---|---|---|---|---|
| Czapek's Solution Agar | Light | Aerial mycelium and sporulation white, sparse. Sporulation light. | None | Whitish | |
| Tomato Paste Agar | Moderate | Aerial mycelium and sporulation white. Sporulation light. | do | Lt. Wheat (2 ea.) | |
| Bennett's Agar | do | do | do | Pastel yellow (2 fb) | |
| Asparagine Dextrose Agar | do | do | do | do | |
| Hickey and Tresner's Agar | do | do | do | Lt. Melon Yellow (3 ea.) | Colonies wrinkling prominently. |
| Carvajal's Oatmeal Agar | do | do | Yellowish; light | Pastel Yellow (1½ fb) | Colonies becoming rimose. |
| Potato Dextrose Agar | do | do | do | Pastel Yellow (2 fb) | |
| Tomato Paste Oatmeal Agar | do | Aerial mycelium and sporulation white. Sporulation moderate. | do | Lt. Melon Yellow (3 ea.) | Colonies sectoring. |
| Yeast Extract Agar | do | Aerial mycelium white, sparse. No sporulation. | None | Pastel Yellow (2 fb) | Colonies finely wrinkled. |
| Inorganic Salts-Starch Agar | do | Aerial mycelium and sproulation white. Sporulation light. | do | do | |
| Kuster's Oatflake Agar | do | do | do | Pastel Yellow (1½ fb) | Colonies sectoring. |

TABLE II.—MICROMORPHOLOGY OF STREPBOMYCES CANDIDUS NRRL 3147

| Medium | Aerial Mycelium and/or Sporiferous Structures | Spore Shape | Spore Size | Spore Surface |
|---|---|---|---|---|
| Tomato Paste Oatmeal Agar | Spores in long, straight to flexuous chains | Elongate to elliptical. | 0.4–0.6µ + 0.9–1.1µ | Smooth as determined by electron microscopy. |

TABLE III.—MISCELLANEOUS PHYSIOLOGICAL REACTION OF *STREPTOMYCES CANDIDUS* NRRL 3147
[Incubation Temperature: 28° C.]

| Medium | Incubation Period | Amount of Growth | Physiological Reaction |
|---|---|---|---|
| Synthetic Nitrate Broth | 7 days | Moderate | Nitrate reduced to nitrite. |
| Do | 14 days | do | Do. |
| Organic Nitrate | 7 days | do | Do. |
| Do | 14 days | do | Do. |
| Gelatin | 7 days | Light | Slight liquefaction. |
| Do | 14 days | Moderate | Complete liquefaction. |
| Peptone-Iron Agar | 24 hours | Good | No chromogenicity. |

TABLE IV.—CARBON SOURCE UTILIZATION PATTERN OF *STREPTOMYCES CANDIDUS* NRRL 3147

[Incubation: 10 days. Temperature: 28° C.]

| Carbon source: | Utilization* |
|---|---|
| Adonital | 3 |
| l-Arabinose | 3 |
| Dextran | 1 |
| d-Fructose | 3 |
| i-Inositol | 1 |
| Lactose | 0 |
| d-Mannitol | 3 |
| d-Melezitose | 2 |
| d-Melibiose | 0 |
| d-Raffinose | 2 |
| l-Rhamnose | 0 |
| Salicin | 0 |
| Sucrose | 0 |
| d-Trehalose | 1 |
| d-Xylose | 1 |
| Dextrose | 3 |
| Negative Control | 0 |

*3—Good utilization, 2—Fair utilization, 1—Poor utilization, 0—No utilization.

It is to be understood that for the production of the new antibiotic the present invention is not limited to this particular organism or to organisms fully answering the above growth and microscopic characteristics which are given for illustrative purposes. In fact, it is desired and intended to include the use of mutants produced from the described organism by various means, such as x-radiation, utraviolet radiation, nitrogen mustard, phage exposure and the like as, for example, mutant UV-103 referred to above.

The fermentation process

Cultivation of the new strain of *S. candidus* may be carried out in a wide variety of liquid culture media. Media which are useful for the production of the novel antibiotic include an assimilable source of carbon such as starch, sugar, molasses, glycerol, etc.; an assimilable source of nitrogen such as protein, protein hydrolysate, polypeptides, amino acids, corn steep liquor, etc.; and inorganic anions and cations, such as potassium, sodium, calcium, sulfate, phosphate, choride, etc. Trace elements such as boron, molybdenum, copper, etc., are supplied as impurities of other constituents of the media. Aeration in tanks and bottles is provided by forcing sterile air through or onto the surface of the fermenting medium. Agitation in tanks is provided by a mechanical impeller. An antifoaming agent, such as 1% octadecanol in lard oil may be added as needed.

Shaker flask and small tank inocula

Shaker flask fermentations of *S. candidus* ordinarily are carried out by inoculating 100 milliliters of the following sterile liquid medium in 500 milliliter flasks with washings from an agar slant of the culture.

| Liquid medium: | Grams |
|---|---|
| Molasses | 20 |
| Glucose | 10 |
| Bacto-Peptone | 5 |
| Water to 1000 milliliters. | |

The flasks are incubated at a temperature from 25–29° C., preferably 28° C., and agitated vigorously on a reciprocating shaker for about 72 hours, after which the primary inoculum is used to inoculate larger quantities of the same medium in 20 liter glass fermentors. The incubation is carried out at the same temperature for 48 hours during which the medium is aerated with sterile air.

Tank fermentation

For the production of the antibiotic in tank fermentors the following fermentation medium is preferably used.

| Fermentation medium: | Grams |
|---|---|
| Corn starch | 30.0 |
| Molasses | 20.0 |
| Soybean meal | 15.0 |
| Calcium carbonate | 10.0 |
| Yeast extract | 2.5 |
| Water to 1000 milliliters. | |

Each tank is inoculated with about 4% of inoculum obtained as described above. Aeration is supplied at the rate of 0.5 liter of sterile air per liter of medium per minute and the medium is agitated by an impeller driven at 200–400 r.p.m. The temperature is maintained at 25–29° C., usually at 28° C., and the fermentation is carried out for 72 hours.

Isolation and purification procedure

After the fermentation is completed, the culture mash containing the antibiotic of this invention is adjusted to pH 4.0 and the mash is filtered to remove the mycelium. Diatomaceous earth or any other conventional filtering aid may be used to assist in the filtration. Normally the mycelial cake is washed with water and the wash is pooled with the filtrate.

A synthetic magnesium silicate (Magnesol) is added to the combined filtrate and wash in the proportion of 2% weight/volume. The suspension is agitated for about one-half hour to effect adsorption of the antibiotic and then filtered. Thereafter the Magnesol cake is suspended in a suitable quantity of a mixture of 9 parts of acetone and 1 part of water to elute the antibiotic. The suspension is agitated for about one-half hour and then filtered.

The acetone-water eluate is concentrated in vacuo while n-butanol, in the approximate amount of 10% of the original volume of eluate, is slowly added. The concentration is continued until an approximate volume of 15% of the original volume of eluate is reached. The aqueous layer is separated from the resultant two-phase, n-butanol-water system and is extracted again with an additional small quantity of n-butanol. The aqueous layer may be then discarded, and the two n-butanol extracts are pooled.

The pooled n-butanol solution is washed first with a dilute aqueous sodium hydroxide solution and then twice with water and concentrated in vacuo to about $\frac{1}{20}$ of the volume of the combined n-butanol extracts. The antibiotic crystallizes from the dry n-butanol concentrate. The crystals may be collected by filtration and washed with acetone. Further recrystallizations of the antibiotic from a suitable solvent mixture, such as methanol and acetone, yield a pure product.

AO–341 was extracted from the culture filtrate (pH 8) with one-half volume of n-butanol by stirring and separating layers. The butanol layer was concentrated in vacuo, washed with aqueous acid and alkali and further concentrated. This provided a butanol solution of crude AO–341β which was further purified as above.

The novel antibiotic of the invention, AO–341 is a basic substance and contains the elements carbon, hydrogen, nitrogen and oxygen in substantially the following percentages by weight:

| | |
|---|---|
| Carbon | 58.0 |
| Hydrogen | 6.4 |
| Nitrogen | 13.5 |
| Oxygen (by difference) | 22.1 |

The percent methyl groups attached to a carbon is 5.8. AO–341 dissolved in water and titrated with hydrochloric acid is found to have a neutralization equivalent weight of 1315 with a pKa of 6.6. The product has a melting point of 225–230° C., with decomposition. Optical rotation is $[\alpha]_D^{25°}$ —104° (c.=1.1 in methanol-water 1:1). When solutions of the antibiotic in methanol-water, 1:1 are exposed to utraviolet light absorption maxima occur at the following wavelengths:

$$\lambda_{max}\ 338\ m\mu\ (E^{1\%}_{1\ cm.}=170)$$
$$\lambda\ 289\ m\mu\ (E^{1\%}_{1\ cm.}=93)\ \text{shoulder}$$
$$\lambda_{max}\ 278\ m\mu\ (E^{1\%}_{1\ cm.}=110)$$
$$\lambda_{max}\ 222\ m\mu\ (E^{1\%}_{1\ cm.}=525)$$

An infrared absorption spectrum of the new antibiotic is prepared in a standard manner by mixing the antibiotic with potassium bromide crystals and compressing the mixture into a pellet. The compound exhibits characteristic absorption in the infrared region of the spectrum at the following wavelengths expressed in microns: 3.00, 3.40, 5.78, 6.10, 6.65, 6.90, 7.32, 7.52, 8.15, 8.48, 8.88, 9.15, 9.40, 10.05 and 13.95. The infrared curve is shown in FIGURE 1 of the accompanying drawings.

A proton magnetic resonance spectrum of the antibiotic is prepared with a Varian A-60 spectrometer at 60 megacycles in the conventional manner by dissolving the antibiotic in deuterodimethylsulfoxide containing dimethylsulfoxide and tetramethylsilane as internal standards. The compound presents a characteristic complex spectrum with broad, unresolved absorption bands centered at the following frequencies expressed in $\delta$ (delta) units: 1.0, 2.0, 3.5, 4.3, 4.6, 7.1, 7.5, and 7.9 with small peaks at 8.7, 10.0, 10.7, and 11.7 The resonance spectrum is shown in FIGURE 2 of the accompanying drawings.

The stability of the antibiotic in solution is illustrated by the following table.

TABLE V.—STABILITY OF AO-341 AT VARIED pH TIME AND TEMPERATURE

| | Percent of Antibiotic Activity Remaining | | |
|---|---|---|---|
| | 25° C., 4 hr. | 80° C., 1 hr. | 0° C., 4 hr. |
| pH 1 | 100 | 100 | 85 |
| pH 4 | 100 | 100 | 80 |
| pH 7.5 | 100 | 100 | 65 |
| pH 9 | 100 | 100 | 50 |
| pH 11 | 60 | 0 (20% after 10 min.) | 0 |

(Antibiotic is dissolved in a mixture of 9% water and 10% methanol.)

Acid hydrolysis of AO-341 and subsequent two-dimensional paper chromatography indicates the presence of various amino acids including L-proline, glycine, alanine, serine, threonine and allothreonine in the hydrolysate. There was no indication that any amino carboxylic acids were present.

By paper chromatography, the $R_f$ value of AO-341 is about 0.20 in a solvent system consisting of isoamyl alcohol, methyl isobutyl ketone, acetic acid, and water (100:150:50:200).

The new antibiotic was differentiated from all other antibiotics by paper chromatography. It does not contain amino dicarboxylic acids which are formed in a number of polypeptide antibiotics.

The crystalline antibiotic, AO-341 is very soluble in methanol and ethyleneglycol monomethyl ether, moderately soluble in ethanol and n-butanol, slightly soluble in water and acetone and insoluble in chloroform and hydrocarbon solvents.

The novel antibiotic is clearly distinguished from other antibiotics by its chemical and physical properties, as described above, and by its antimicrobial spectrum. The specific antimicrobial activity of the antibiotic of this invention is determined by serial dilution assays and is presented in the table below which shows the minimal inhibitory concentration required to inhibit the growth of representative micro-organisms in trypticase soy broth.

TABLE VI.—IN VITRO MINIMAL INHIBITORY CONCENTRATION SPECTRA [1]

| Organism | AO-341, mcg./ml. | Polyacetyl derivative of AO-341, mcg./ml. |
|---|---|---|
| Bacillus subtilis ATCC 6633 | 0.8 | [2] |
| Sarcina lutea ATCC 9341 | 1.6 | 1.6 |
| Staphylococcus aureus ATCC 6548P | 6.2 | [2] |
| Staphylococcus aureus Lederle 4050B-122-7 | 3.1 | 12.5 |
| Staphylococcus aureus Lederle 4050B-122-13 | 12.5 | 25.0 |
| Staphylococcus aureus Lederle 4050B-122-14 | 6.2 | 25.0 |
| Staphylococcus aureus Rose ATCC 14154 | 6.2 | 12.5 |
| Staphylococcus aureus Smith | 3.1 | 12.5 |
| Streptococcus faecalis ATCC 8043 | 12.5 | 12.5 |
| Streptococcus pyogenes C203 | 0.8 | 0.8 |
| Streptococcus pyogenes Lederle 8053B-40-1 | 3.1 | 12.5 |
| Streptococcus pyogenes Lederle 8053B-40-2 | 6.2 | 6.2 |
| Streptococcus pyogenes Lederle 8053B-40-3 | 1.6 | 1.6 |
| Streptococccus pyogenes NY5 | 0.8 | 0.8 |
| Streptococcus sp., -Strep. 11 | 12.5 | 12.5 |
| Streptococcus sp. β-Strep. 80 | 12.5 | 6.2 |

[1] Agar Dilution Streak Test.
[2] Not tested.

The novel antibiotic of this invention is active against gram-positive micro-organisms, such as Staphylococci, Diplococci and Streptococci. The new antibiotic is thus potentially useful as a therapeutic agent in treating bacterial infections in animals caused by such micro-organisms. The new antibiotic can be expected to be usefully employed for controlling such infections by topical application or parenteral administration.

The usefulness of the new antibiotic is demonstrated by its ability to control systemic lethal infections in mice. The novel antibiotic of this invention shows substantial in vivo antibacterial activity in mice against Staphylococcus aureus, strain Smith, when administered by a single oral or subcutaneous dose to groups of Carworth Farms CF-1, female mice, weight about 20 grams, infected intraperitoneally with a lethal dose of Staphylococcus aureus, strain Smith, $10^{-2}$ trypticase soy broth (TSP) dilution of a five-hour TSP blood culture. Likewise, the antibiotic shows significant in vivo antibacterial activity in mice against Streptococcus pyogenes, C-203 when administered by a single subcutaneous dose to groups of above described mice infected intraperitoneally with a lethal dose of Streptococcus pyogenes, C-203, $10^{-5}$ trypticase soy broth (TSP) dilution of a five-hour TSP blood culture. The new antibiotic is also effective against Diplococcus pneumoniae infections in mice.

Tables VII and VIII illustrate the in vivo antibacterial activity of the new antibiotic.

TABLE VII.—IN VIVO ANTIBACTERIAL ACTIVITY OF AO-341

| Test System | Dosage, mg./kg. body wt. | Survivors/Total Treated | |
|---|---|---|---|
| | | S.O.D.[1] | S.S.C.[2] |
| Staphylococcus aureus, strain Smith | 1,280 | 10/10 | |
| | 640 | 23/30 | |
| | 320 | 4/30 | |
| | 160 | 5/30 | |
| | 10 | | 10/10 |
| | 5 | | 30/30 |
| | 2.5 | | 24/30 |
| | 1.25 | | 1/20 |
| Streptococcus pyogenes, C-203 | 320 | | 20/20 |
| | 160 | Inactive orally | 19/20 |
| | 80 | | 14/20 |
| | 40 | | 1/20 |

[1] S.O.D.=Single Oral Dose.
[2] S.S.C.=Single Subcutaneous Dose.

All of the infected non-treated controls died within one day.

TABLE VIII.—IN VIVO ANTIBACTERIAL ACTIVITY OF AO-341

| Test System | Dosage, mg./kg. body wt. | Survivors/Total Treated S.S.C.[1] |
|---|---|---|
| Diplococcus pneumoniae | 40 | 20/20 |
| | 20 | 17/20 |
| | 10 | 14/20 |
| | 5 | 8/20 |
| | 2.5 | 1/20 |
| | 1.25 | 0/20 |

[1] S.S.C.=Single subcutaneous dose.

All of the infected non-treated controls died within two days.

Example 1.—Inoculum preparation

A typical medium used to grow the primary inoculum is prepared according to the following formula:

|  | Grams |
| --- | --- |
| Molasses | 20 |
| Glucose | 10 |
| Bacto-Peptone | 5 |
| Water to 1000 milliliters. | |

Two 100 ml. quantities of the above sterile medium in two 500 ml. flasks are inoculated with the washings of an agar slant of the new strain of *Streptomyces candidus*. The flasks are placed on a reciprocating shaker and agitated vigorously for 72 hours, at 28° C. The flask inocula are then used to seed 12 liters of the above medium in 20 liter bottles. These bottles are incubated and aerated for 48 hours to induce further growth. Aeration is supplied at the rate of 0.325 cubic feet per minute of sterile air. The medium is then used to seed the fermentor tanks.

Example 2.—Fermentation

A fermentation medium is prepared according to the following formula:

|  | Grams |
| --- | --- |
| Corn starch | 30.0 |
| Molasses | 20.0 |
| Soybean meal | 15.0 |
| Calcium carbonate | 10.0 |
| Yeast extract | 2.5 |
| Water to 1000 milliliters. | |

The fermentation medium is sterilized at 120° C. with steam at 15 pounds pressure for 60 minutes. The pH of the medium before and after sterilization is between 6.5 and 7.0. Three hundred liters of sterile medium in 100 gallon fermentors are inoculated with 12 liters of the bottle inoculum described above and the fermentation is carried out at 28° C. for 72 hours. The medium is agitated by an impeller driven at 300 revolutions per minute, and aerated at the rate of 0.5 liter of sterile air per liter of medium per minute. At the end of the fermentation period the culure is harvested.

Example 3.—Isolation and purification

Three hundred liters of culture mash, obtained as described in Example 2 is adjusted to pH 4.0 and about 3% weight/volume of diatomaceous earth is added. The mixture is filtered, the filter cake is washed with 30 liters of water, and the cake is then discarded. The water wash and filtrate are pooled (volume 300 liters) and 2% weight/volume of Magnesol is added to the solution to adsorb the antibiotic activity. The suspension is agitated for approximately one-half hour and then filtered. The Magnesol cake is suspended in about 60 liters of an acetone-water (9:1) mixture to elute the antibiotic and again the suspension is agitated for approximately one-half hour and then filtered, after which the cake is discarded. The acetone-water eluate is concentrated in vacuo while n-butanol is slowly added to the mixture. Concentration is continued until a total volume of about 9 liters (6 liters, n-butanol; 3 liters, water) is reached. The aqueous portion is separated from the n-butanol layer and extracted again with an additional one liter of n-butanol, after which the aqueous portion is discarded. The n-butanol layers are pooled and the combined extract is given a wash with two liters of water adjusted to pH 10 with sodium hydroxide. The n-butanol phase is then washed twice with two liters of water. The washes are discarded and the n-butanol extract is concentrated in vacuo to about 500 milliliters. Crystallization of AO-341 from the n-butanol concentrate is induced by seeding. The crystals are collected by filtration and washed with a small quantity of acetone. The yield of crystalline antibiotic is 34 grams.

The crystals are further purified by repeated recrystallizations from a methanol-acetone solvent system.

The chemical analysis of this product and its other chemical, physical, and biological properties have already been described.

Example 4.—Preparation of the hydrochloride salt of the new antibiotic

One gram of AO-341 prepared according to Example 3 is dissolved in about 20 ml. of methanol and 1 ml. of 1 N hydrochloric acid is added to the solution. The mixture is then evaporated to dryness in vacuo. The resultant residue is dissolved in a small amount of methanol and acetone is added to precipitate the salt. The crystals are collected by filtration. The yield of AO-341 hydrochloride is 740 mg. Further recrystallization using methanol and acetone or water and acetone produces a product of blade-like crystals which decompose at 238–241° C. with frothing.

Elemental analysis: C, 56.0%; H, 6.5%; N, 13.7%; Cl, 3.2%; O (by difference), 20.6%.

Optical rotation $[\alpha]_D^{25°}$ −106° (c.=0.99 in methanol-water, 1:1). Ultraviolet absorption maxima occur at:

$$338 \text{ m}\mu \ (E_{1cm.}^{1\%}=165)$$

$$290 \text{ m}\mu \ (E_{1cm.}^{1\%}=85)$$

$$276 \text{ m}\mu \ (E_{1cm.}^{1\%}=105)$$

$222 \text{ m}\mu \ (E_{1cm.}^{1\%}=490)$ in methanol=water 1:1

There is no significant difference in in vitro activity between the hydrochloride salt of the antibiotic and the free base but in in vivo tests the hydrochloride seems to be about equal to the base.

Example 5.—Preparation of polyacetyl derivative

Two grams of AO-341 is dissolved in about 30 ml. of reagent-grade pyridine and the solution is added to 8 ml. of acetic anhydride. The mixture is stoppered and kept at room temperature for 16 hours and then poured into 200 ml. of ice water. After two hours the resulting precipitate is collected by filtration and washed with 50 ml. of cold 0.1 N HCl and then with water. The yield of the crude polyacetyl derivative is 1.9 grams.

The crude product is dissolved in chloroform and chromatographed on a silica gel column (50 grams of silica gel, column 1 inch in diameter). The column is developed with a solution of 2% to 3% methanol in chloroform. Eluate fractions are collected and those containing polyacetyl AO-341 are concentrated in vacuo to an oily residue which is then crystallized using ethyl acetate and acetone. The yield of white crystalline product is 330 mg. A further recrystallization using chloroform and methanol produces a product of white needles which darken and decompose at 223–230° C.

Elemental analysis indicates the following average percentages by weight: C, 56.7%; H, 6.3%; N, 12.1%; O (by difference) 24.9%.

Percent acetyl is 12.4 (as $CH_3CO$).

Ultraviolet maxima occur at:

$$336 \text{ m}\mu \ (E_{1cm.}^{1\%}=172)$$

$$289 \text{ m}\mu \ (E_{1cm.}^{1\%}=94)$$

$$278 \text{ m}\mu \ (E_{1cm.}^{1\%}=107)$$

$221 \text{ m}\mu \ (E_{1cm.}^{1\%}=\text{off scale})$ in methanol=water 1:1

Example 6.—Preparation of N-acetyl AO-341

Three grams of AO-341 hydrochloride salt, prepared according to Example 4, were dissolved in 100 ml. of dried methanol contained in a foil-wrapped, dried flask equipped with a Drierite tube. Silver acetate (408 mg.) and acetic anhydride (.50 ml.) were added to the magnetically-stirred reaction mixture. After three hours at room temperature, the precipitated silver chloride was removed by filtration and three drops of 1 N HCl was added to the filtrate. After setting overnight, the acidified mixture was refiltered and the filtrate poured into 200 ml. of acidic ice water. The precipitated product was filtered, washed with 0.1 N HCl and water and dried to yield 2.5 g. of tan powder. After crystallization from methanol-acetone, 2 g. of crystalline N-acetyl AO–341 was obtained, melting point 235–240° dec.

Anal.—Found C, 58.2; H, 6.6; —COCH$_3$, 3.0.

Example 7.—Preparation of N-succinyl AO–341

Three grams of AO–341 hydrochloride, prepared according to Example 4, were dissolved in 100 ml. of dried methanol contained in a foil-wrapped, dried flask equipped with a Drierite tube. Silver acetate (408 mg.) and succinic anhydride (500 mg.) were added to the magnetically stirred reaction mixture. After two hours at room temperature an additional 200 mg. of succinic anhydride was added. After an additional hour the precipitated silver chloride was filtered and 3 drops of 1 N HCl was added to the filtrate. After setting overnight, the acidified mixture was refiltered and the filtrate poured into 200 ml. of acidic ice water. The precipitated product was filtered, washed with 0.1 N HCl and water and dried to yield 2.1 g. of tan powder. This was crystallized from methanol-acetone to give 1.32 g. of N-succinyl AO–341, melting point 230–235° dec.

Anal.—Found C, 57.57; H, 6.34.

We claim:

1. A substance from the group consisting of a basic antibiotic AO–341 characterized as follows:

Melting point: 225–230° C.
Analysis:                                    Percent
  Carbon _____ 58.0
  Hydrogen _____ 6.4
  Nitrogen _____ 13.5
  Oxygen (by difference) _____ 22.1
Neutralization equivalent: 1315 with a pKa of 6.6
Optical rotation: $[\alpha]_D^{25°}$ —104° (c.=1.1 in methanol-water 1:1)
Ultraviolet maxima:

$$\lambda_{max}\ 338\ m\mu\ (E_{1\ cm.}^{1\%}=170)$$

$$\lambda\ 289\ m\mu\ (E_{1\ cm.}^{1\%}=93)\ \text{shoulder}$$

$$\lambda_{max}\ 278\ m\mu\ (E_{1\ cm.}^{1\%}=110)$$

$\lambda_{max}\ 222\ m\mu\ (E_{1\ cm.}^{1\%}=525)$ in methanol-water 1:1

Infrared spectrum: as shown in Figure 1
Proton resonance spectrum: as shown in Figure 2, and salts thereof.

2. A substance basic antibiotic AO–341 characterized as follows:

Melting point: 225–230° C.
Analysis:                                    Percent
  Carbon _____ 58.0
  Hydrogen _____ 6.4
  Nitrogen _____ 13.5
  Oxygen (by difference) _____ 22.1
Neutralization equivalent: 1315 with a pKa of 6.6
Optical rotation $[\alpha]_D^{25°}$ —104° (c.=1.1 in methanol-water 1:1)
Ultraviolet maxima:

$$\lambda_{max}\ 338\ m\mu\ (E_{1\ cm.}^{1\%}=170)$$

$$\lambda\ 289\ m\mu\ (E_{1\ cm.}^{1\%}=93)\ \text{shoulder}$$

$$\lambda_{max}\ 278\ m\mu\ (E_{1\ cm.}^{1\%}=110)$$

$\lambda_{max}\ 222\ m\mu\ (E_{1\ cm.}^{1\%}=525)$ in methanol-water 1:1

Infrared spectrum: as shown in Figure 1
Proton resonance spectrum: as shown in Figure 2.

3. A composition of matter consisting of the substance according to claim 2 in the crystalline state.

4. A therapeutic composition containing as an essential antibacterial agent a compound as characterized in claim 2, and a pharmaceutical carrier.

5. A process which comprises cultivating a microorganism from the group consisting of *Streptomyces candidus* NRRL 3147 and 3148 in an aqueous nutrient medium containing assimilable sources of carbohydrate, nitrogen and inorganic salts under submerged aerobic conditions until substantial antibiotic activity is imparted to said medium by the production of a compound as characterized in claim 2.

6. A process which comprises cultivating a microorganism from the group consisting of *Streptomyces candidus* NRRL 3147 and 3148 in an aqueous nutrient medium containing assimilable sources of carbohydrate, nitrogen and inorganic salts under submerged aerobic conditions for a period of from 24 to 240 hours and at a temperature of from 20 to 35° C. until substantial antibiotic activity is imparted to said medium by the production of a compound as characterized in claim 2 and then recovering the antibiotic activity therefrom.

References Cited

UNITED STATES PATENTS 3,061,514   10/1962   Saeger _____ 167—65

ALBERT T. MEYERS, *Primary Examiner.*

JULIAN S. LEVITT, *Examiner.*

J. GOLDBERG, *Assistant Examiner.*